United States Patent
Huang et al.

(10) Patent No.: US 11,309,826 B2
(45) Date of Patent: Apr. 19, 2022

(54) METHOD AND APPARATUS FOR CONTROLLING PERMANENT MAGNET MOTOR, POWER SYSTEM AND ELECTRIC VEHICLE

(71) Applicant: JIANGSU CONTEMPORARY AMPEREX TECHNOLOGY LIMITED, Liyang (CN)

(72) Inventors: Xiaojian Huang, Liyang (CN); Xiyang Zuo, Liyang (CN); Zhimin Dan, Liyang (CN); Bao Li, Liyang (CN)

(73) Assignee: JIANGSU CONTEMPORARY AMPEREX TECHNOLOGY LIMITED, Liyang (CN)

( * ) Notice: Subject to any disclaimer, the term of this patent is extended or adjusted under 35 U.S.C. 154(b) by 0 days.

(21) Appl. No.: 17/529,511

(22) Filed: Nov. 18, 2021

(65) Prior Publication Data

US 2022/0077811 A1 Mar. 10, 2022

Related U.S. Application Data

(63) Continuation of application No. PCT/CN2020/121300, filed on Oct. 15, 2020.

(30) Foreign Application Priority Data

Jun. 15, 2020 (CN) .......................... 202010540328.8

(51) Int. Cl.
*H02P 29/68* (2016.01)
*H02P 27/06* (2006.01)
(Continued)

(52) U.S. Cl.
CPC .............. *H02P 29/68* (2016.02); *B60L 50/51* (2019.02); *B60L 58/24* (2019.02);
(Continued)

(58) Field of Classification Search
CPC ...... H02P 29/68; H02P 2207/05; H02P 27/06; B60L 58/27; B60L 50/51; B60L 58/24; H01M 10/425; H01M 10/63
See application file for complete search history.

(56) References Cited

U.S. PATENT DOCUMENTS 10,538,169 B2 1/2020 Sun et al.
2018/0067086 A1* 3/2018 Tian ................... G01N 29/4454
(Continued)

FOREIGN PATENT DOCUMENTS

CN 1767370 A 5/2006
CN 100346572 C 10/2007
(Continued)

*Primary Examiner* — Thai T Dinh
(74) *Attorney, Agent, or Firm* — Scully Scott Murphy & Presser

(57) ABSTRACT

A method and an apparatus for controlling a permanent magnet motor, a power system and an electric vehicle. A power frequency of the permanent magnet motor is set by obtaining system parameters such as a resonance bandwidth of the permanent magnet motor and a natural frequency of a stator of the permanent magnet motor, and the permanent magnet motor is supplied power by using alternating current at the power frequency when a power battery meets a self-heating condition. Noises generated by the motor is reduced during a self-heating process of the power battery.

20 Claims, 3 Drawing Sheets

(51) Int. Cl.
*B60L 58/24* (2019.01)
*B60L 50/51* (2019.01)
*H01M 10/42* (2006.01)
*H01M 10/48* (2006.01)

(52) U.S. Cl.
CPC ....... *H01M 10/425* (2013.01); *H01M 10/486* (2013.01); *H01M 2010/4271* (2013.01); *H01M 2220/20* (2013.01); *H02P 2207/05* (2013.01)

(56) References Cited

U.S. PATENT DOCUMENTS

| | | | | |
|---|---|---|---|---|
| 2018/0076744 | A1* | 3/2018 | Wolf | H02P 6/10 |
| 2019/0222160 | A1* | 7/2019 | Yoshida | H02M 7/48 |
| 2019/0334469 | A1* | 10/2019 | Hara | H02P 27/08 |
| 2019/0366854 | A1* | 12/2019 | Sun | B60L 15/08 |

FOREIGN PATENT DOCUMENTS

| | | |
|---|---|---|
| CN | 103560304 A | 2/2014 |
| CN | 105932363 A | 9/2016 |
| CN | 107666028 A | 2/2018 |
| CN | 109823234 A | 5/2019 |
| CN | 110048192 A | 7/2019 |
| CN | 110557079 A | 12/2019 |
| CN | 110651426 A | 1/2020 |
| CN | 111439132 A | 7/2020 |
| JP | 2010259217 A | 11/2010 |

\* cited by examiner

METHOD AND APPARATUS FOR CONTROLLING PERMANENT MAGNET MOTOR, POWER SYSTEM AND ELECTRIC VEHICLE

CROSS-REFERENCE TO RELATED APPLICATIONS

This application is a continuation of International Application No. PCT/CN2020/121300, filed on Oct. 15, 2020, which claims priority to Chinese Patent Application No. 202010540328.8, filed on Jun. 15, 2020. The disclosures of the aforementioned applications are hereby incorporated by reference in their entireties.

TECHNICAL FIELD

This application relates to the field of electric vehicles, and more specifically, to a method and an apparatus for controlling a permanent magnet motor, a power system and an electric vehicle.

BACKGROUND

An electric vehicle refers to a vehicle powered by a power battery. Due to material limitation of the power battery, the power battery can stably exert its best performance only under a rated ambient temperature. Therefore, when the electric vehicle is used in areas with relatively low ambient temperatures, the power battery needs to be heated to the rated ambient temperature.

Existing heating methods of power battery may be indirect heating and direct heating. The indirect heating refers to placing a heat source outside the power battery for heating. The direct heating refers to heating the power battery inside the power battery. A common direct heating method is heating through a motor. Specifically: the power battery is connected to the motor through an inverter, and a rotor of the motor is fixed and does not rotate. The power battery and a stator winding form a closed loop, and the stator winding stores electric energy. Since an internal resistance of the power battery is relatively large in a low-temperature environment, a power battery winding applies alternating current excitation to the power battery, and the power battery uses its own internal resistance for heating.

However, there is too much noise during a process of heating the power battery through the motor.

SUMMARY

This application provides a method and an apparatus for controlling a permanent magnet motor, a power system and an electric vehicle to reduce noises during a self-heating process of the power battery.

In a first aspect, this application provides a method for controlling a permanent magnet motor, where the method includes:

obtaining system parameters of the permanent magnet motor, where the system parameters include: a resonance bandwidth of the permanent magnet motor and a natural frequency of a stator of the permanent magnet motor;

setting a power frequency of the permanent magnet motor according to the system parameters;

supplying power to the permanent magnet motor by using alternating current at the power frequency when a power battery meets a self-heating condition;

where an even multiple of the power frequency is outside a resonance frequency band, and the resonance frequency band is determined according to the natural frequency of the stator and the resonance bandwidth of the permanent magnet motor.

Optionally, that an even multiple of the power frequency is outside a resonance frequency band includes:

the even multiple of the power frequency is less than or equal to a lower boundary of the resonance frequency band; or the even multiple of the power frequency is greater than or equal to an upper boundary of the resonance frequency band.

Optionally, that the even multiple of the power frequency is less than or equal to a lower boundary of the resonance frequency band is specifically:

$$2kf \leq f_e^i - B \forall i=1,2,\ldots,M;$$

that the even multiple of the power frequency is greater than or equal to an upper boundary of the resonance frequency band is specifically:

$$2kf \geq f_e^i + B \forall i=1,2,\ldots,M;$$

where $f_e^i$ is an $i^{th}$-order natural frequency of the stator of the permanent magnet motor, f is the power frequency, B is ½ of the resonance bandwidth of the stator of the permanent magnet motor, M is the highest order of the natural frequency of the stator of the permanent magnet motor, and k is a positive integer.

Optionally, M=4.

One embodiment of the foregoing application has the following beneficial effects: considering that motor vibration is mainly caused by frequencies of radial electromagnetic force in the first four order resonance frequency band of the stator of the motor, by changing the power frequency of a winding of the stator, the even multiple of the power frequency may avoid all the first four order resonance frequency band of the stator, thereby eliminating main vibration and reducing control difficulty.

Optionally, the method further includes:

obtaining a battery cell temperature of the power battery and operating status of the permanent magnet motor;

correspondingly, that a power battery meets a self-heating condition includes:

the battery cell temperature is less than a preset temperature threshold, and the operating status is stopped status.

One embodiment of the foregoing application has the following beneficial effects: when the battery cell temperature of the power battery is less than the preset temperature threshold, and the operating status of the motor is stopped status, the permanent magnet motor is fed with the alternating current whose power frequency is outside the resonance frequency band. It can avoid problem of vibration caused by the winding in the motor as an energy storage element to supply the alternating current for the power battery.

Optionally, the method further includes:

obtaining a duty ratio;

correspondingly, the supplying power to the permanent magnet motor by using alternating current at the power frequency specifically includes:

generating a pulse width modulation signal according to the power frequency and the duty ratio, where the signal is used to supply the alternating current at the power frequency to the permanent magnet motor.

One embodiment of the foregoing application has the following beneficial effects: the signal for controlling the inverter is generated according to the power frequency and the duty ratio, so that the permanent magnet motor is fed with alternating current with the power frequency outside the resonance frequency band, frequency of the generated radial electromagnetic force is avoided from the natural frequency of the stator of the motor, and noises caused by resonance of the radial electromagnetic force is reduced.

In a second aspect, this application provides an apparatus for controlling a permanent magnet motor, including:

an obtaining module, configured to obtain system parameters of the permanent magnet motor, where the system parameters include: a resonance bandwidth of the permanent magnet motor and a natural frequency of a stator of the permanent magnet motor;

a determining module, configured to set a power frequency of the permanent magnet motor according to the system parameters;

a control module, configured to supply power to the permanent magnet motor by using alternating current at the power frequency when a power battery meets a self-heating condition;

where an even multiple of the power frequency is outside a resonance frequency band, and the resonance frequency band is determined according to the natural frequency of the stator and the resonance bandwidth of the permanent magnet motor.

Optionally, that an even multiple of the power frequency is outside a resonance frequency band includes:

the even multiple of the power frequency is less than or equal to a lower boundary of the resonance frequency band; or the even multiple of the power frequency is greater than or equal to an upper boundary of the resonance frequency band.

Optionally, that the even multiple of the power frequency is less than or equal to a lower boundary of the resonance frequency band is specifically:

$$2kf \leq f_e^i - B \forall i=1,2,\ldots,M;$$

that the even multiple of the power frequency is greater than or equal to an upper boundary of the resonance frequency band is specifically:

$$2kf \geq f_e^i + B \forall i=1,2,\ldots,M;$$

where $f_e^i$ is an $i^{th}$-order natural frequency of the stator of the permanent magnet motor, f is the power frequency, B is ½ of the resonance bandwidth of the stator of the permanent magnet motor, M is the highest order of the natural frequency of the stator of the permanent magnet motor, and k is a positive integer.

Optionally, M=4.

Optionally, the obtaining module is further configured to:
obtain a battery cell temperature of the power battery and operating status of the permanent magnet motor;
correspondingly, that a power battery meets a self-heating condition includes:
the battery cell temperature is less than a preset temperature threshold, and the operating status is stopped status.

Optionally, the obtaining module is further configured to:
obtain a duty ratio;
correspondingly, the control module is specifically configured to:
generate a pulse width modulation signal according to the power frequency and the duty ratio, where the pulse width modulation signal is used to supply the alternating current at the power frequency to the permanent magnet motor.

In a third aspect, this application provides a power system, including: a power battery, an inverter, a permanent magnet motor, and a motor controller, where the motor controller is configured to execute the method for controlling a permanent magnet motor in the first aspect and optional solutions.

According to a fourth aspect, this application provides an electric vehicle, including a power system, where the power system includes a power battery, an inverter, a permanent magnet motor, and a motor controller, and the motor controller is configured to execute the method for controlling the permanent magnet motor in the first aspect and optional solutions.

The method and the apparatus for controlling a permanent magnet motor, the power system and the electric vehicle in this application change the power frequency of the stator winding through that the frequency of the radial electromagnetic force is an even multiple of the power frequency of the stator winding, so that the even multiple of the power frequency is outside the resonance frequency band, the frequency of the generated radial electromagnetic force is avoided from the natural frequency of the stator of the motor, and noises caused by resonance of the radial electromagnetic force is reduced.

DESCRIPTION OF EMBODIMENTS

To make objectives, technical solutions, and advantages of this application clearer, the technical solutions in this application will be clearly and completely described below in combination with the accompanying drawings in this application. Obviously, the described embodiments are a part of the embodiments of this application, rather than all of the embodiments. Based on the embodiments in this application, all other embodiments obtained by a person of ordinary skill in the art without creative work shall fall within the protection scope of this application.

Figure 1:
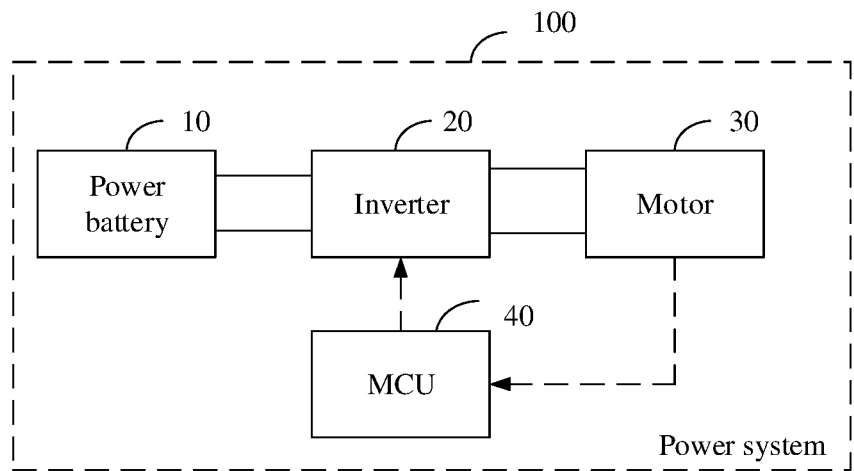
FIG. 1 is a schematic structural diagram of a power system of an electric vehicle provided in this application.

An electric vehicle refers to a vehicle powered by a power battery. As shown in FIG. 1, a power system 100 of the electric vehicle includes a power battery 10, an inverter 20, a motor 30, and a motor controller unit (referred to as MCU for short) 40. Positive and negative electrodes of the power battery 10 are connected to a direct current side of the inverter 20, and an alternating current side of the inverter 20 is connected to a stator winding of the motor 30. The power battery 10 supplies power to the motor through the inverter 20. The MCU 40 has multiple input ends for receiving motor operating status data and motor control instructions. The MCU 40 generates a pulse width modulation (referred to as PWM for short) signal according to the motor control instruction, the motor operating status data, and operating status data of the power battery, and controls the inverter to supply voltage and current to the motor 30 to control a rotate speed of the motor, thereby achieving speed control of the vehicle.

Figure 2:
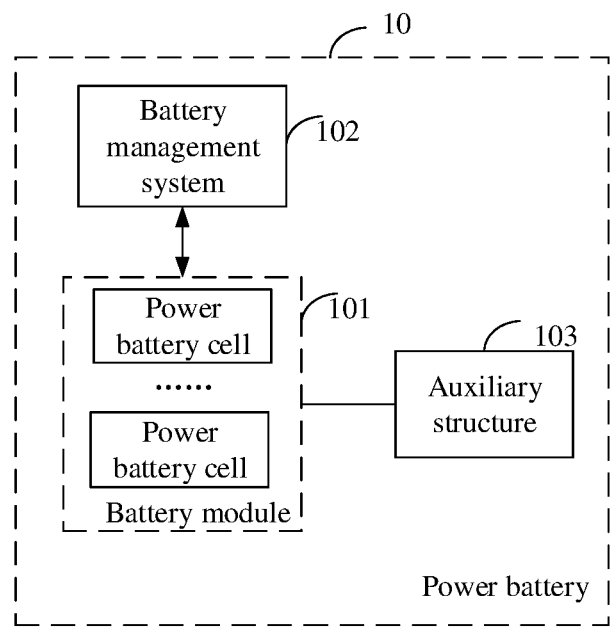
FIG. 2 is a schematic structural diagram of a power battery provided in this application.

As shown in FIG. 2, the power battery 10 includes a battery module 101, a battery management system (referred to as BMS for short) 102, and an auxiliary structure 103. The battery module 101 is formed by multiple power battery cells in series and parallel. The power battery cell is a core component of the power battery and is a source of electric energy supplied by the power battery. Main functions of the battery management system 102 are to perform charge and discharge management, high voltage control, battery state evaluation, battery data collection, battery protection, and battery thermal management. Generally, the auxiliary structure 103 includes an external frame, an electrical connection apparatus, an insulating part, and the like. The external frame plays the roles of protecting and supporting the battery module, the electrical connection apparatus plays a role of connecting with other electrical devices, such as connecting with the inverter, and the insulating part plays a role of insulation protection.

The thermal management function in the battery management system 102 is used to ensure that the power battery operates within a suitable temperature range. The thermal management function is mainly to achieve accurate measurement and monitoring of the battery temperature, effective heat dissipation when a temperature of batteries is too high, as well as quick heating in a low-temperature condition, so as to ensure uniform distribution of temperature fields of the batteries. The quick heating in a low-temperature condition means that, in areas where a battery cell temperature is relatively low, the power battery needs to be heated to a rated battery cell temperature so that the power battery stably exert its best performance.

Existing heating methods of the power battery may be indirect heating and direct heating. The indirect heating refers to placing a heat source outside the power battery for heating. The indirect heating method may be air heating, liquid heating, heating-film heating, and the like. For different heating sources, heating rates of the battery are also different. Since the battery is heated through an external heat source, and heat loss will occur on a heat transfer medium, therefore efficiency of the indirect heating is not high.

The direct heating refers to heating the power battery inside. A common direct heating method is heating through an internal resistance, specifically: fixing a rotor of the motor, inputting a PWM signal to a control end of the inverter, the power battery and the stator winding forming a closed loop, and the stator winding storing electric energy. Due to inductance characteristics of the stator winding, the stator winding also supplies alternating current to the battery, and the power battery is heated by the alternating current flowing through its own internal resistance. Since the internal resistance of the power battery is relatively large in a low temperature, and therefore the heating efficiency of the power battery is higher.

However, in the existing method of heating through the internal resistance of the power battery, when the motor supplies heating current to the power battery, the stator winding is used as an energy storage element to achieve alternating current on the bus. The foregoing method changes magnetic field distribution of the motor during normal operation, which makes the motor subject to unbalanced force internally, easily causes the motor to generate vibration and noise, and makes three indexes NVH of the electric vehicle to be substandard. NVH is an abbreviation of Noise, Vibration, and Harshness, and NVH are important indicators of a comfort level of the vehicle.

This application provides a method and an apparatus for controlling a permanent magnet motor, a power system and an electric vehicle, aiming to resolve the problem mentioned above. The inventive concept of this application is: determining a resonance frequency of the permanent magnet motor according to system parameters of the permanent magnet motor, and controlling an even multiple of a power frequency outside a resonance frequency band, so that a vibration frequency of the permanent magnet motor is far away from a resonance frequency of the rotor of the permanent magnet motor, thereby reducing noise generated by vibration, and improving a comfort level of users when driving a vehicle.

Figure 3:
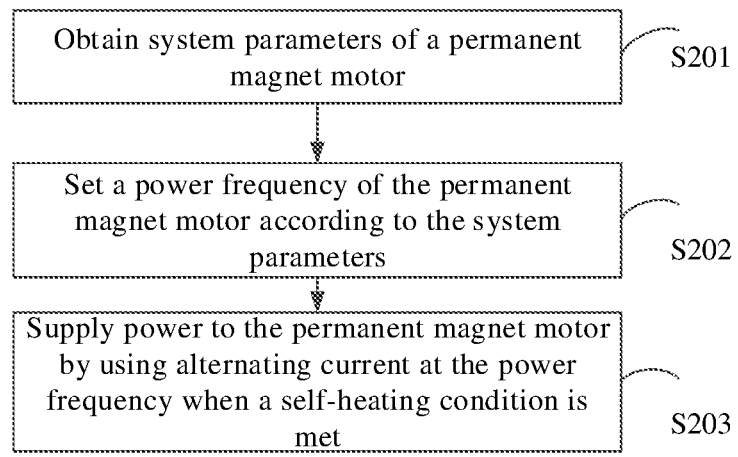
FIG. 3 is a flowchart of a method for controlling a permanent magnet motor provided in Embodiment 1 of this application.

The following focuses on the method for controlling the permanent magnet motor provided in this application in combination with embodiments. An execution body of the control method is a MCU. FIG. 3 is a flowchart of the method for controlling the permanent magnet motor provided in Embodiment 1 of this application. As shown in FIG. 3, the method for controlling the permanent magnet motor provided in this application includes the following steps:

S201. The MCU obtains system parameters of the permanent magnet motor.

The system parameters include a resonance bandwidth of the permanent magnet motor and a natural frequency of a stator of the permanent magnet motor.

S202. The MCU sets a power frequency of the permanent magnet motor according to the system parameters.

The setting a power frequency of the permanent magnet motor according to the system parameters specifically includes: determining the resonance frequency band according to the natural frequency of the stator of the permanent magnet motor and the resonance bandwidth of the permanent magnet motor, determining the power frequency according to the resonance frequency band, and setting the even multiple of the power frequency of the permanent magnet motor outside the resonance frequency band.

S203. The MCU supplies power to the permanent magnet motor by using alternating current at the power frequency when a power battery meets a self-heating condition.

That a power battery meets a self-heating condition includes: battery cell temperature of the power battery is less than a preset temperature threshold, and the operating status of the permanent magnet motor is stopped status. The stopped status refers to that the rotor is at a standstill or the rotor is in a blocking state.

In the control method provided in the embodiments of this application, the resonance frequency band of the stator is determined according to the natural frequency of the stator and the resonance bandwidth, and the permanent magnet motor is supplied with alternating current at the even multiple of the power frequency outside the resonance frequency band, and noises during a self-heating process of the power battery are reduced.

The following describes the method for controlling a permanent magnet motor provided in Embodiment 2 of this application. The method for controlling a permanent magnet motor provided in this application includes the following steps:

S301. The MCU obtains system parameters of the permanent magnet motor.

The system parameters include a resonance bandwidth of the permanent magnet motor and a natural frequency of a stator of the permanent magnet motor. When the natural frequency of the stator is obtained, as an implementation, the natural frequency of the stator of the permanent magnet motor is measured through performing a vibration test on the permanent magnet motor. As another implementation, structural parameters of the permanent magnet motor may also be calculated. The structural parameters include: stator mass distribution, stator stiffness, and the like. Because a vibration amplitude of resonating occurred in first few orders of the natural frequency of the stator is much greater than a vibration amplitude of vibrating occurred in a high order of the natural frequency of the stator, thereby the first few orders of the natural frequency of the stator are selected for setting the power frequency to reduce a control complexity of the MCU. It is preferable to select the first four orders of the natural frequency of the stator for setting the power frequency to eliminate main vibration and reduce control difficulty.

S302. The MCU sets a power frequency of the permanent magnet motor according to the system parameters.

The determining the resonance frequency band according to the natural frequency of the stator of the permanent magnet motor and the resonance bandwidth of the permanent magnet motor specifically includes:

If the natural frequency of the stator of the permanent magnet motor is represented by $f_e^i$, where i=1, 2, ..., and N, i represents an order of the natural frequency, and B is ½ of the resonance bandwidth of the stator of the permanent magnet motor, the resonance frequency band is represented by:

$$[f_e^i - B, f_e^i + B]$$

Where $f_e^i - B$ represents a lower boundary of the resonance frequency band, and $f_e^i + B$ represents an upper boundary of the resonance frequency band.

Correspondingly, that the even multiple of the power frequency of the permanent magnet motor is outside the resonance frequency band specifically includes: the even multiple of the power frequency is less than or equal to the lower boundary of the resonance frequency band; or the even multiple of the power frequency is greater than or equal to the upper boundary of the resonance frequency band. Namely, the power frequency of the permanent magnet motor is made to meets the following relationships:

$$2kf \leq f_e^i - B \forall i=1,2,\ldots,M$$

$$2kf \geq f_e^i + B \forall i=1,2,\ldots,M$$

where M is the highest order of the natural frequency of the stator of the permanent magnet motor, and k is a positive integer.

S303. The MCU obtains a battery cell temperature of a power battery and operating status of the permanent magnet motor.

When the battery cell temperature of the power battery is obtained, the battery cell temperature of the power battery is detected by a sensor disposed inside the power battery. When the operating status of the permanent magnet motor is obtained, movement status of the rotor is detected by a sensor disposed on the permanent magnet motor.

S304. The MCU supplies power to the permanent magnet motor by using alternating current at the power frequency when the power battery meets a self-heating condition.

When the battery cell temperature of the power battery is less than the preset temperature threshold, and the operating status of the permanent magnet motor is stopped status, the permanent magnet motor is supplied with the alternating current at the power frequency, being able to avoid problem of vibration caused by a winding in the motor as an energy storage element to supply the alternating current for the power battery.

When the alternating current at the power frequency is used to supply power to the permanent magnet motor, the MCU generates a PWM signal according to the power frequency and a preset duty ratio. A control end of an inverter receives the PWM signal, and outputs the alternating current at the power frequency. The winding of the permanent magnet motor is supplied with the alternating current at the power frequency. The even multiple of the power frequency is outside the resonance frequency band of the stator, and frequency of radial electromagnetic force is the even multiple of the power frequency of a stator winding. Therefore, the frequency of the radial electromagnetic force is avoided from the resonance frequency band, then resonance caused by the radial electromagnetic force is reduced to reduce motor vibration.

A three-phase permanent magnet synchronous motor is taken as an example to describe feasibility of the control method provided in this embodiment. Main sources of vibration noises of a motor body may be divided into a radial electromagnetic force, a tangential electromagnetic force, an unbalanced magnetic pulling force, an unbalanced mechanical force, and a magnetic hysteresis force. An 8-pole, 48-slot motor commonly used in electric vehicles is taken as an example, an amplitude of the radial electromagnetic force of the motor, which is also the main source of electric vehicle noises, is usually much higher than the other four noise sources. Therefore, by eliminating the radial electromagnetic force, the noises may be effectively suppressed within a noise threshold range.

The stator of the motor may be regarded as a cylinder made of laminated silicon steel sheets. Since vibration shapes of the stator are inherent, the stator corresponds to vibration shapes with different orders, and each vibration shape is corresponding to a natural frequency.

For vibration of the motor, a distribution shape and a frequency of the radial electromagnetic force along the space are two important factors. First, when distribution of the radial electromagnetic force of the motor along the space is consistent with a stator vibration shape of any one of first four orders of the stator, even if the resonance frequency is not reached at this time, a forced vibration amplitude may be much larger than a vibration amplitude when they are not consistent. Secondly, resonance will occur when a natural frequency corresponding to each vibration order of the stator is consistent with the frequency of the radial electromagnetic force. At this time, the amplitude of the radial electromagnetic force may also increase a lot. A structure of the motor needs to be changed due to the distribution of the radial electromagnetic force along the space, and therefore it is the most effective method to avoid the resonance frequency by changing the frequency of the radial electromagnetic force.

The following describes how to calculate and obtain the frequency of the radial electromagnetic force. Different from a circular rotating magnetic field generated by the stator winding during normal operation of the motor, the battery self-heating technology makes the stator winding of the motor generate magnetomotive force of a pulsating. At this time, harmonic content of air gap flux density of the motor may be higher, which may produce more low-order low-frequency radial electromagnetic forces. The electromagnetic force is calculated at this time, and an air gap shape of the motor cannot be calculated as a circle, but should be treated equivalently as an ellipse. Specific ellipse deformation is related to the power frequency and current of the stator winding. The higher the power frequency, the greater the current, and the greater the deformation of the ellipse.

Through finite element simulation to simulate stator deformation, the radial electromagnetic force distribution is obtained, and the following conclusions are obtained: under a battery self-heating control strategy, main harmonic content in radial electromagnetic force wave may be reduced, but additional spatiotemporal harmonic contents may be produced. These additional harmonic contents may produce many components of the low-order low-frequency radial electromagnetic force waves, to have a greater impact on electromagnetic vibration of the motor. In other words, in the condition of battery self-heating, spatial orders of the radial electromagnetic force have changed, and many low-order electromagnetic forces may be generated, but no new electromagnetic force frequency will be generated. At this time, the frequency of the radial electromagnetic force may be calculated according to a formula under a normal operating condition of the motor.

The radial electromagnetic force of the motor is caused by interaction between a stator magnetic field and a rotor magnetic field of the motor. The reasons, like structure of the motor and a wiring method of the winding and so on, will cause a stator fundamental wave magnetic field, stator harmonic magnetic fields, a rotor fundamental wave magnetic field, and rotor harmonic magnetic fields. Therefore, the radial electromagnetic force is not only caused by interaction between the stator fundamental wave magnetic field and the rotor fundamental wave magnetic field, interaction between harmonic magnetic fields in a same order of the stator and the rotor and interaction of stator harmonic magnetic fields may also produce radial electromagnetic forces of different frequencies. Therefore, when the stator is supplied with three-phase symmetrical alternating current, a calculation process of the frequency of the radial electromagnetic force is as follows:

$$f_r = \frac{1}{2\mu_0}(B_S + B_R)^2 \quad (1)$$

where $f_r$ represents the radial electromagnetic force, $B_S$ represents stator flux density, $B_R$ represents rotor flux density, and $\mu_0$ represents air permeability.

$$B_S = F_1(\alpha, t)\Lambda_g \quad (2)$$

$$B_R = F_2(\alpha, t)\Lambda_g \quad (3)$$

where, in formulas (2) and (3), $\Lambda_g$ represents equivalent air gap magnetic conductance, $\alpha$ is an angle of the air gap along a circumference, t represents time, $F_1$ represents magnetomotive force generated by the three-phase symmetrical stator winding, and $F_2$ represents magnetomotive force generated by a permanent magnet of the rotor.

$$F_1(\alpha, t) = \sum_{v=1}^{\infty} F_{mv}\cos(vp\alpha - \omega t) \quad (4)$$

$$F_2(\alpha, t) = \sum_{\mu=1}^{\infty} F_{m\mu}\cos(\mu p\alpha - \omega_\mu t + \phi_\mu) \quad (5)$$

where, in formulas (4) and (5), v represents harmonic order of the stator; μ represents harmonic order of the rotor; ω is an angular frequency of the stator; $F_{mv}$ is an amplitude of $v^{th}$-order harmonic magnetomotive force of the stator; $F_{m\mu}$ is a amplitude of $\mu^{th}$-order harmonic magnetomotive force of the rotor; $\omega_\mu$ is an electrical angular frequency of the $\mu^{th}$-order harmonic magnetomotive force of the rotor, setting to 0 under battery heating control strategy; $\phi_\mu$ is an angle between the $\mu^{th}$-order harmonic magnetomotive force of the rotor and an initial location, and p is the number of pole pairs.

Formulas (2) to (5) are substituted into the formula (1), and the frequency of the radial electromagnetic force, harmonic of the rotor magnetic field, and harmonic of the stator magnetic field may be obtained by using a product to sum formula. The following takes a relationship between radial electromagnetic forces generated by first 13 harmonics of the stator magnetic field and the rotor magnetic field and the frequency as an example for description. As shown in Table 1.

Table 1 shows frequencies of radial electromagnetic forces

| Rotor Harmonic | Stator Harmonic | | | | |
| --- | --- | --- | --- | --- | --- |
| | 1 | −5 | 7 | −11 | 13 |
| | Electromagnetic Force Frequency | | | | |
| 1 | 0 | 0 | 0 | 0 | 0 |
| | 2f | 2f | 2f | 2f | 2f |
| 3 | 2f | 2f | 2f | 2f | 2f |
| | 4f | 4f | 4f | 4f | 4f |
| 5 | 4f | 4f | 4f | 4f | 4f |
| | 6f | 6f | 6f | 6f | 6f |
| 7 | 6f | 6f | 6f | 6f | 6f |
| | 8f | 8f | 8f | 8f | 8f |
| 9 | 8f | 8f | 8f | 8f | 8f |
| | 10f | 10f | 10f | 10f | 10f |
| 11 | 10f | 10f | 10f | 10f | 10f |
| | 12f | 12f | 12f | 12f | 12f |
| 13 | 12f | 12f | 12f | 12f | 12f |
| | 14f | 14f | 14f | 14f | 14f |

It can be seen from Table 1 that the frequency of the radial electromagnetic force is always in an even multiple relationship with the power frequency of the winding. Moreover, it can be deduced from the table that the relationship between the frequency of the radial electromagnetic force and the power frequency is: (μ±1) f, where f represents the power frequency of the winding. In the control method provided in the embodiments of this application, that the frequency of the radial electromagnetic force is even multiple of the power frequency of the stator winding is used, the MCU makes the inverter output the alternating current whose even multiple of the power frequency is outside the resonance frequency band. In this way, the frequency of the radial electromagnetic force generated by the motor is avoided from the natural frequency of the stator of the motor, and noises caused by resonance of the radial electromagnetic force may be reduced.

Figure 4:
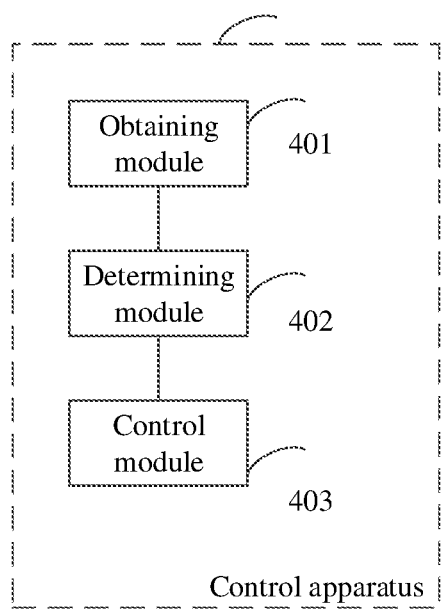
FIG. 4 is a schematic structural diagram of an apparatus for controlling a permanent magnet motor provided in Embodiment 3 of this application.

FIG. 4 is a schematic structural diagram of an apparatus for controlling a permanent magnet motor provided in Embodiment 3 of this application. The apparatus 400 for controlling the permanent magnet motor is configured to execute the method for controlling a permanent magnet motor provided in the foregoing embodiments. As shown in FIG. 4, the apparatus 400 for controlling the permanent magnet motor provided in Embodiment 3 of this application includes:

an obtaining module 401, configured to obtain system parameters of the permanent magnet motor, where the system parameters include: a resonance bandwidth of the permanent magnet motor and a natural frequency of a stator of the permanent magnet motor;

a determining module 402, configured to set a power frequency of the permanent magnet motor according to the system parameters; and a control module 403, configured to supply power to the permanent magnet motor by using alternating current at the power frequency when a power battery meets a self-heating condition;

where an even multiple of the power frequency is outside a resonance frequency band, and the resonance frequency band is determined according to the natural frequency of the stator and the resonance bandwidth of the permanent magnet motor.

Optionally, that an even multiple of the power frequency is outside a resonance frequency band includes:

the even multiple of the power frequency is less than or equal to a lower boundary of the resonance frequency band; or the even multiple of the power frequency is greater than or equal to an upper boundary of the resonance frequency band.

Optionally, that the even multiple of the power frequency is less than or equal to a lower boundary of the resonance frequency band is specifically:

$$2kf \leq f_e^i - B \forall i=1,2,\ldots,M;$$

that the even multiple of the power frequency is greater than or equal to an upper boundary of the resonance frequency band is specifically:

$$2kf \geq f_e^i + B \forall i=1,2,\ldots,M;$$

where $f_e^i$ is an $i^{th}$-order natural frequency of the stator of the permanent magnet motor, f is the power frequency, B is ½ of the resonance bandwidth of the stator of the permanent magnet motor, M is the highest order of the natural frequency of the stator of the permanent magnet motor, and k is a positive integer.

Optionally, M=4.

Optionally, the obtaining module 401 is further configured to:

obtain a battery cell temperature of the power battery and operating status of the permanent magnet motor;

correspondingly, that a power battery meets a self-heating condition includes:

the battery cell temperature is less than a preset temperature threshold, and the operating status is stopped status.

Optionally, the obtaining module 401 is further configured to: obtain a duty ratio; and correspondingly, the control module 403 is specifically configured to:

generate a PWM signal according to the power frequency and the duty ratio, where the PWM signal is used to supply the alternating current at the power frequency to the permanent magnet motor with.

Figure 5:
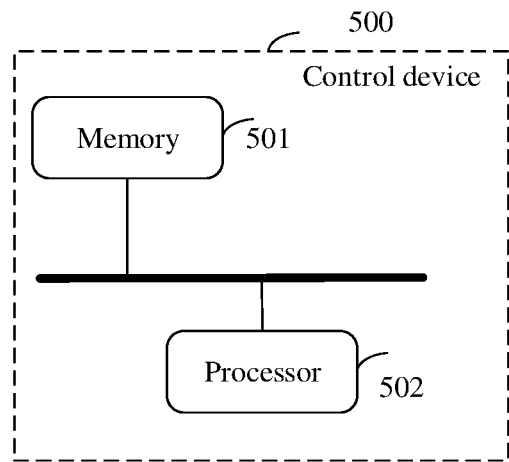
FIG. 5 is a schematic structural diagram of a control device provided in Embodiment 4 of this application.

FIG. 5 is a schematic structural diagram of a control device showed in Embodiment 4 of this application. As shown in FIG. 5, the control device 500 provided in the embodiments includes: a memory 501 and a processor 502.

The memory 501 is configured to store computer executable instructions; and

The processor 502 is configured to execute the computer executable instructions stored in the memory, to implement each step executed in the method for controlling a permanent magnet motor in the foregoing embodiments. For details, please refer to relevant description about the method for controlling a permanent magnet motor in the foregoing embodiments.

Optionally, the foregoing memory 501 may be independent or integrated with the processor 502.

When the memory 501 is set independently, the control device also includes a bus for connecting the memory 501 and the processor 502.

The embodiments of this application also provide a computer readable storage medium, and computer executable instructions are stored in the computer readable storage medium. When a processor executes the computer executable instructions, the method for controlling a permanent magnet motor executed by the foregoing control device is implemented.

The embodiments of this application also provide a power system, including: a power battery, an inverter, a permanent magnet motor, and a motor controller, where the motor controller is configured to execute the method for controlling a permanent magnet motor provided in the foregoing embodiments.

Figure 6:
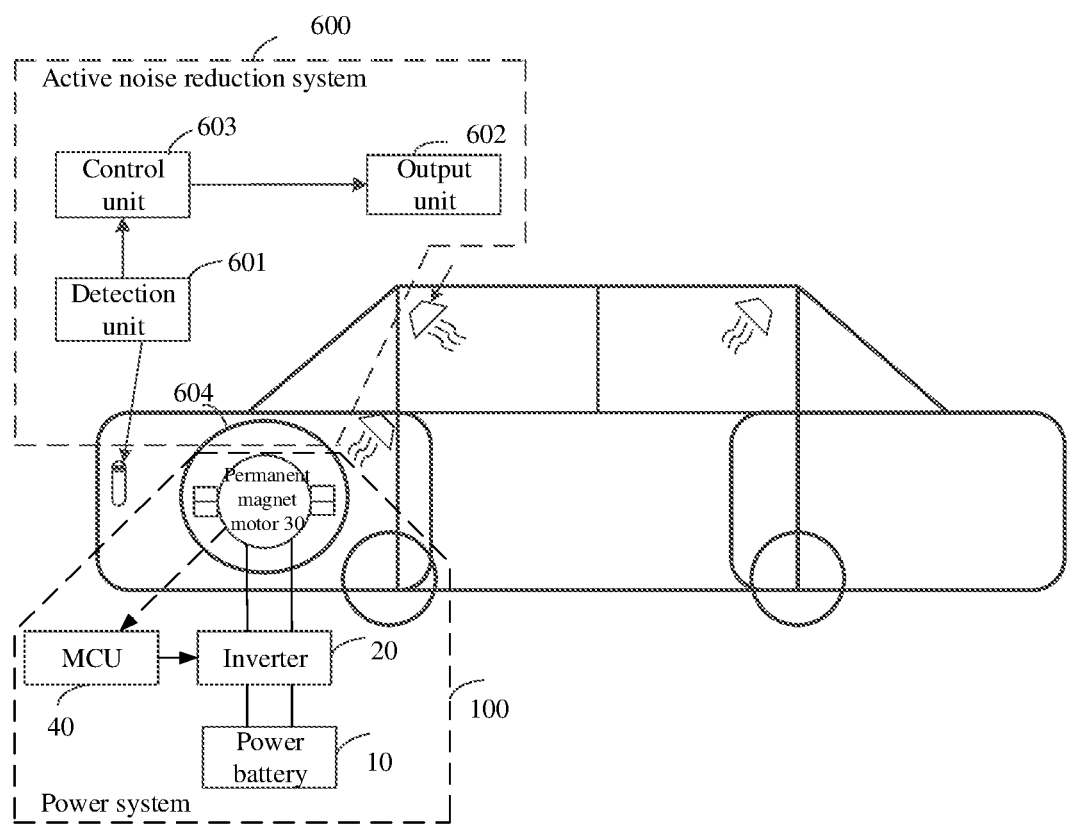
FIG. 6 is a schematic structural diagram of an electric vehicle provided in Embodiment 5 of this application.

As shown in FIG. 6, the embodiments of this application also provide an electric vehicle, including a power system 100 in the foregoing embodiments, where the power system 100 includes a power battery 10, an inverter 20, a permanent magnet motor 30, and a motor controller MCU 40, and the motor controller MCU 40 is configured to execute the method for controlling a permanent magnet motor provided in the foregoing embodiments.

To further reduce the impact of motor vibration on a comfort level of the vehicle, continue to refer to FIG. 6, an acoustic package 604 and a set of active noise reduction system 600 are installed on the vehicle.

The acoustic package 604 with sound insulation and attraction effect wraps the motor to reduce motor noises. The active noise reduction system 600 includes a detection unit 601, an output unit 602, and a control unit 603. The detection unit 601 and the output unit 602 are respectively connected to the control unit 603. An operation principle of the active noise reduction system is described below with reference to FIG. 6: the detection unit 601 is located in a nacelle, and the detection unit 601 is used to collect noises generated by the motor and transmit the noises generated by the motor to the control unit 603. The control unit 603 outputs, by using an algorithm, a sound wave with a phase difference of 180° from the noise and a same amplitude with the noise. The output unit 602 outputs the sound wave to cancel the motor noises. The detection unit 601 may be a microphone, and the output unit 602 may be a player. The output unit 602 may be located in the nacelle or a passenger compartment to improve a passenger comfort level.

Vibration is reduced by changing the MCU to control frequency, combined with the acoustic package and the active noise reduction solution, the motor vibration caused by the battery self-heating technology can be effectively reduced, and the motor vibration can be further optimized on an original basis. For occasions where motor vibration requirements are low, a combination of any two noise reduction solutions can also reduce motor vibration, so that the three indexes NVH of electric vehicles meet standards.

Finally, it should be noted that the above embodiments are only used to illustrate the technical solutions of this application, but not to limit this application; although this application has been described in detail with reference to the foregoing embodiments, a person of ordinary skills in the art should understand that: it is still possible to modify the technical solutions described in the foregoing embodiments, or equivalently replace some or all of the technical features; and these modifications or replacements do not deviate the essence of the corresponding technical solutions from the technical solutions of the embodiments of this application.

What is claimed is:

1. A method for controlling a permanent magnet motor, wherein the method comprises:
    obtaining system parameters of the permanent magnet motor, wherein the system parameters comprise: a resonance bandwidth of the permanent magnet motor and a natural frequency of a stator of the permanent magnet motor;
    setting a power frequency of the permanent magnet motor according to the system parameters;
    supplying power to the permanent magnet motor by using alternating current at the power frequency when a power battery meets a self-heating condition;
    wherein an even multiple of the power frequency is outside a resonance frequency band, and the resonance frequency band is determined according to the natural frequency of the stator and the resonance bandwidth of the permanent magnet motor.

2. The method according to claim 1, wherein that an even multiple of the power frequency is outside a resonance frequency band comprises:
    the even multiple of the power frequency is less than or equal to a lower boundary of the resonance frequency band.

3. The method according to claim 2, wherein
    that the even multiple of the power frequency is less than or equal to a lower boundary of the resonance frequency band is specifically:

$2kf \leq f_e^i - B \forall i = 1, 2, \ldots, M;$ wherein $f_e^i$ is an $i^{th}$-order natural frequency of the stator of the permanent magnet motor, f is the power frequency, B is ½ of the resonance bandwidth of the stator of the permanent magnet motor, M is the highest order of the natural frequency of the stator of the permanent magnet motor, and k is a positive integer.

4. The method according to claim 3, wherein M=4.

5. The method according to claim 1, wherein that an even multiple of the power frequency is outside a resonance frequency band comprises:
    the even multiple of the power frequency is greater than or equal to an upper boundary of the resonance frequency band.

6. The method according to claim 5, wherein
    that the even multiple of the power frequency is greater than or equal to an upper boundary of the resonance frequency band is specifically:

$2kf \geq f_e^i + B \forall i = 1, 2, \ldots, M;$ wherein $f_e^i$ is an $i^{th}$-order natural frequency of the stator of the permanent magnet motor, f is the power frequency, B is ½ of the resonance bandwidth of the stator of the permanent magnet motor, M is the highest order of the natural frequency of the stator of the permanent magnet motor, and k is a positive integer.

7. The method according to claim 6, wherein M=4.

8. The method according to claim 1, wherein the method further comprises:
    obtaining a battery cell temperature of the power battery and operating status of the permanent magnet motor;
    correspondingly, that a power battery meets a self-heating condition comprises:
    the battery cell temperature is less than a preset temperature threshold, and the operating status is stopped status.

9. The method according to claim 1, wherein the method further comprises:
    obtaining a duty ratio;
    correspondingly, the supplying power to the permanent magnet motor by using alternating current at the power frequency specifically comprises:
    generating a pulse width modulation signal according to the power frequency and the duty ratio, wherein the signal is used to supply the alternating current at the power frequency to the permanent magnet motor with.

10. A power system, comprising: a power battery, an inverter, a permanent magnet motor, and a motor controller, wherein the motor controller is configured to execute the method for controlling a permanent magnet motor according to claim 1.

11. An electric vehicle, comprising a power system, wherein the power system comprises a power battery, an inverter, a permanent magnet motor, and a motor controller, and the motor controller is configured to execute the method for controlling a permanent magnet motor according to claim 1.

12. An apparatus for controlling a permanent magnet motor, comprising:
    an obtaining module, configured to obtain system parameters of the permanent magnet motor, wherein the system parameters comprise: a resonance bandwidth of the permanent magnet motor and a natural frequency of a stator of the permanent magnet motor;
    a determining module, configured to set a power frequency of the permanent magnet motor according to the system parameters;
    a control module, configured to supply power to the permanent magnet motor by using alternating current at the power frequency when a power battery meets a self-heating condition;
    wherein an even multiple of the power frequency is outside a resonance frequency band, and the resonance frequency band is determined according to the natural frequency of the stator and the resonance bandwidth of the permanent magnet motor.

13. The apparatus according to claim 12, wherein that an even multiple of the power frequency is outside a resonance frequency band comprises:
    the even multiple of the power frequency is less than or equal to a lower boundary of the resonance frequency band.

14. The apparatus according to claim 13, wherein
    that the even multiple of the power frequency is less than or equal to a lower boundary of the resonance frequency band is specifically:

$2kf \leq f_e^i - B \forall i = 1, 2, \ldots, M;$ wherein $f_e^i$ is an $i^{th}$-order natural frequency of the stator of the permanent magnet motor, f is the power frequency, B is ½ of the resonance bandwidth of the stator of the permanent magnet motor, M is the highest order of the natural frequency of the stator of the permanent magnet motor, and k is a positive integer.

15. The apparatus according to claim 14, wherein M=4.

16. The apparatus according to claim 12, wherein that an even multiple of the power frequency is outside a resonance frequency band comprises:

the even multiple of the power frequency is greater than or equal to an upper boundary of the resonance frequency band.

17. The apparatus according to claim 16, wherein that the even multiple of the power frequency is greater than or equal to an upper boundary of the resonance frequency band is specifically:

$2kf \geq f_e^i + B \forall i = 1, 2, \ldots, M;$ wherein $f_e^i$ is an $i^{th}$-order natural frequency of the stator of the permanent magnet motor, f is the power frequency, B is ½ of the resonance bandwidth of the stator of the permanent magnet motor, M is the highest order of the natural frequency of the stator of the permanent magnet motor, and k is a positive integer.

18. The apparatus according to claim 17, wherein M=4.

19. The apparatus according to claim 12, wherein the obtaining module is further configured to:

obtain a battery cell temperature of the power battery and operating status of the permanent magnet motor;

correspondingly, that a power battery meets a self-heating condition comprises:

the battery cell temperature is less than a preset temperature threshold, and the operating status is stopped status.

20. The apparatus according to claim 12, wherein the obtaining module is further configured to:

obtain a duty ratio;

correspondingly, the control module is specifically configured to:

generate a pulse width modulation signal according to the power frequency and the duty ratio, wherein the signal is used to supply the alternating current at the power frequency to the permanent magnet motor.

* * * * *